United States Patent

Kauschinger et al.

[11] Patent Number: 5,645,377
[45] Date of Patent: Jul. 8, 1997

[54] APPARATUS FOR INSITU REMEDIATION OF WASTE THROUGH MULTI-POINT INJECTION

[75] Inventors: Joseph L. Kauschinger, Alpharetta, Ga.; Scott T. Evans, Sandy, Utah

[73] Assignee: Christensen Boyles Corporation, Salt Lake City, Utah

[21] Appl. No.: 691,448

[22] Filed: Aug. 2, 1996

Related U.S. Application Data

[63] Continuation of Ser. No. 432,546, May 2, 1995, abandoned.
[51] Int. Cl.$^6$ .................................................. B09B 1/00
[52] U.S. Cl. ..................................... 405/269; 405/128
[58] Field of Search ................................ 588/249, 259; 405/269, 128, 266, 267, 270

[56] References Cited

U.S. PATENT DOCUMENTS

| | | | |
|---|---|---|---|
| 4,428,700 | 1/1984 | Lennemann | 405/128 |
| 5,061,119 | 10/1991 | Balthaus et al. | 405/128 |
| 5,133,625 | 7/1992 | Albergo et al. | 405/263 |
| 5,173,217 | 12/1992 | Buckle | 252/628 |
| 5,416,257 | 5/1995 | Peters | 405/128 X |

FOREIGN PATENT DOCUMENTS

| | | |
|---|---|---|
| 1910195 | 6/1986 | Italy. |

*Primary Examiner*—William P. Neuder
*Attorney, Agent, or Firm*—Kokjer Kircher Bowman & Johnson

[57] ABSTRACT

Method and apparatus for treating confined material such as buried waste or areas of contaminated earth by injecting a plurality of high velocity jets of treating fluid into the material over a limited depth in multiple direction from each of a plurality of injection holes. The high velocity jets remain stationary, but the arrangement of the jets emanating from an injection hole in multiple directions produces a result similar to a rotating jet but with increased penetrating force. The jets are operated sequentially over the limited depth of each injection hole to treat a layer of the material and are then moved and again operated sequentially over another limited depth of each injection hole to provide treatment of the material by layers. This allows effective treatment of material surrounding each injection hole without substantial interference from treating fluid flowing through the material from a previously treated hole. It is preferred that each injection hole be lined during installation with a material that is easily cut by the high velocity jets so that the jets pass from a source inside the lined injection hole, through the lining, and into the material to be treated surrounding the hole.

8 Claims, 5 Drawing Sheets

APPARATUS FOR INSITU REMEDIATION OF WASTE THROUGH MULTI-POINT INJECTION

This is a continuation of application Ser. No. 08/432,546, filed May 2, 1995, now abandoned.

BACKGROUND OF THE INVENTION

1. Field

The invention is in the field of treating and stabilizing buried waste, areas of contaminated earth or soil, sludge lagoons, or similar types of materials.

2. State of the Art

In many cases, waste is disposed of by burying the waste. In some cases, particularly in the disposal of radioactive wastes, shallow trenches are dug about three meters wide and between three and five meters deep and waste is deposited in such trenches. When filled with waste to about one meter of the top of the trench, the trench is covered with earth to cover the waste. Such waste presents a huge volume of heterogeneous contamination which is continually percolating into the soil and ground water. The buried waste usually includes various types of containers such as plastic bags, cardboard boxes, steel drums, and glass containers. The useful life of these containers to act as localized containment is usually much less than the time over which the enclosed chemicals or other wastes remain dangerous and can inflict harm to the environment.

It has become desirable for various buried waste sites to stabilize the waste in some way. This may be done by injecting stabilizing fluids into the buried waste. In many cases a grout is injected under relatively low pressure into the waste material with the expectation that the grout will flow through the waste, surround it, and solidify to stabilize such waste. With normal low pressure grouting procedures, however, the grout does not generally penetrate the various containers of waste, but merely surrounds them with grout. It has been found that by merely surrounding the containers with grout, the containers remain unstabilized and can collapse over time, thus creating voids in the mass of grout and waste formed by the low pressure grout treatment. The unstabilized waste, if mobile, can migrate through the open void spaces in the grout and be released and the voids created can lead to subsidence or collapse of the skeletal structure of the solidified grout.

The limitations of conventional low pressure grout injection can be overcome using high velocity jets to cut and mix the waste with stabilizing agents. However, conventional jet injection requires the use of surface drilling equipment to install the injection lances and to pull the lances from the ground during injection. Usually, a single drill hole is injected over its entire length, starting at the bottom of the hole and moving upwardly toward the top. When injection is completed for one hole, the drilling equipment is then moved to the next hole and the process is repeated. When stabilizing contaminated waste in this manner, several problems arise:

a) Because the buried waste includes open void space, grout tends to flow away from the area immediately surrounding the hole being injected. This grout flow is similar to low pressure conventional grouting which cannot form a homogeneous stabilized waste form due to the presence of intact containers.

b) The flow of grout outside the area immediately surrounding the hole being injected, i.e., outside the zone of influence of the cutting jet, increases the depth of grout inside the buried waste and inside adjacent untreated holes. As more drill holes are injected, the grout depth increases inside the buried waste and in remaining untreated drill holes. As injection lances are inserted into these untreated holes, they become submerged in the grout filling these holes. The submergence of the lances and thus the jets of grout emanating therefrom causes a severe loss of cutting energy of the jets. If the grout in an untreated hole has hardened before the lance is inserted, all benefits of the high pressure jet is lost.

c) Conventional jet injection usually requires the use of a surface drill to rotate and extract the injection lances. Rotation of the lances is necessary to direct the jet in various directions around the hole. The rotation, however, does not allow the cutting energy to be projected as far as when the jets are directed in a single direction as they are lifted. The rotating lances do not have enough concentrated cutting energy to cut robust containers, such as steel drums or wooden boxes.

d) Due to the necessary rotation of the jets, the only way to ensure cutting of robust containers is to rupture the containers during the installation of the injection lance. This requires very close spacing between injection holes, typically 50–75 cm.

e) Since a surface drill is used to rotate and extract the injection lances and the injection holes are sequentially injected from bottom to top, there is a very high probability that the surface mounted drill and operators can become exposed to contaminated waste which is ejected from the ground. Alternatively, the stabilizing fluid may break out of the ground and erupt at the surface increasing the likelihood of worker and equipment exposure to contamination.

SUMMARY OF THE INVENTION

According to the invention, effective treatment of confined material, such as buried waste, areas of contaminated ground, containerized waste, or other confined material in need of treatment, such as washing or stabilization, is accomplished by installing a plurality of injection holes through the material to be treated. A plurality of fluid directing monitors are positioned in, if not all, at least a plurality of the holes. Each fluid directing monitor includes nozzle means, such as holes through the wall of the monitor or separate nozzles positioned in holes through the wall of the monitor, to direct a plurality of high velocity streams of fluid in a plurality of directions outwardly from the monitor into the material surrounding the hole. The monitors provide the high velocity streams of fluid over only a limited depth of the holes through the material. The number of jets and the length of the monitor over which the jets are spaced will depend upon the equipment used to supply the pressurized fluid to the monitor and on the characteristics of the material being treated. As a minimum, four jets spaced at about ninety degree intervals around the monitor at one position along its length, preferably near or adjacent to the bottom of the monitor, are necessary, and at least two sets of four jets spaced at about ninety degree intervals around the monitor with one set being spaced along the length of the monitor from the other set and rotated about forty-five degrees from the orientation of the other set is preferred. The monitors are initially positioned in the holes at a depth where treatment is to begin, usually the lowest position in the hole where treatment is to take place, and generally at the bottom of the hole. With all of the monitors in desired positions in holes, generally all at the same depth in the holes, pressurized fluid is provided sequentially for set periods of time to each monitor. The set period of time is determined to provide a desired treatment to material within a certain radius of the hole.

After all monitors have been operated in their initial positions to treat the limited depth of material, the monitors are repositioned in the holes, generally raised in the holes, to a new position. Pressurized fluid is again sequentially provided to each monitor to provide the desired treatment over the new limited depth of the holes. This process of moving the monitors and sequentially operating the monitors to provide the high velocity jets is continued until the desired total depth of treatment is obtained from the various steps or increments of treatment of limited depth.

It is also preferred that the holes be lined or cased with a material through which the high velocity streams of fluid can pass outwardly into the material surrounding the hole. For this purpose, it has been found that a cuttable lining material such as polyvinylchloride or high density polyethelene plastic tubing may be used for lining the holes and may be easily inserted as the holes are created. This may be done by securing a disposable drill point to an end of the lining material, inserting a drive rod therein, and driving the point with pipe attached into and through the material to be treated. This eliminates drill cuttings and other potential contamination. The high velocity streams of fluid will cut small holes in the plastic pipe and pass through the holes into the surrounding material.

The invention has been found particularly effective in the in-situ stabilization of buried waste deposits. In such use, a series of injection holes are pre-installed in the waste deposit, and stabilizing material is injected in rapid succession through a plurality of adjacent holes. The stabilizing material is generally a fluid and may be a grout, biological and/or nutrient material, or surfactant or other fluid for the washing or neutralizing of buried waste. Generally the stabilizing material will be injected through the plurality of adjacent holes over the limited depth of the holes starting at the bottom of the holes. When the holes have been injected over the limited depth, the holes are again injected in rapid succession over a similar limited depth, but at the next level above that depth of the hole previously injected. Thus, the holes, and the waste deposit, are filled in stages or layers to limit flow of material from the holes being filled to other parts of the deposit. The grout or other stabilizing material is injected by a plurality of stationary jets arranged, such as in a spiral orientation, so that the stationary jets extend radially outwardly from a hole in a plurality of directions spaced circumferentially around the hole to provide substantially similar injection around the hole as provided by a rotating jet. Because the jets are stationary and thus each jet is directed in the same direction for a longer duration, the jets are much more effective in penetrating the waste material around the hole and in cutting or breaking open containers of waste than are the rotating jets of the prior art.

Since the injection holes are all pre-installed in the waste deposit, and because the injection is through a stationary monitor, no sophisticated drilling equipment is required over the waste deposit during injection to rotate and lift the injection monitors and workers are not required over the waste deposit during injection. This prevents contamination of expensive equipment and keeps workers from possible contamination or other dangers. The grout or other stabilization material injected can be pumped through hoses from a site outside the possible area of contamination danger.

With grout injection, the grout remains in the waste deposit and solidifies to form, ideally, a solid homogeneous stabilized waste form. With other stabilizing materials, such materials may remain in the waste deposit after injection or may be removed therefrom. For example, the cutting jets can introduce surfactants and other additives to initially rupture and puncture containers releasing the contents of the containers and washing the contents of the containers and other contaminants from the buried waste. As the washing takes place, the injected materials along with materials washed from the waste are vacuum extracted from various well points installed in the buried waste.

The injection holes are preferably installed in the waste deposit in a manner to eliminate generation of contaminated drill cuttings. This can be done by driving a disposable drive point mounted on the end of a steel drive rod through the waste deposit. A sleeve of cutable casing is preferably secured to the drive point to extend therefrom upwardly around the drive rod to provide a casing for the hole and prevent contamination of the drive rod. The high velocity jets from the monitors will cut holes through the casing so that the jets will extend outwardly therefrom without interference from the casing. However, the casing otherwise remains intact, so that, if desired, several treatment stages can be provided, i.e., the holes can be used for one treatment and then reentered for a second treatment. Thus, if desired, the material can be pretreated and then grouted after pretreatment is completed.

The pre-installed injection holes also serve as exploratory holes to provide information about the waste deposit to determine the necessary stabilizing procedure. Since these injection holes are much more numerous than the usual exploration holes drilled prior to stabilization in the past, more information can be obtained about the waste deposit so better treatment can be provided.

THE DRAWINGS

The best mode presently contemplated for carrying out the invention is illustrated in the accompanying drawings, in which.

DETAILED DESCRIPTION OF THE ILLUSTRATED EMBODIMENTS

The invention will be described in connection with the stabilization of a trench-type underground waste site such as was common several years ago in connection with the disposal of radioactive wastes. A trench 20 is dug in the earth 21 and waste material 22 is deposited in the trench 20. The trench will generally be about five meters or about fifteen feet deep and about three meters or about ten feet wide. The trench can extend for any desired length. Waste is piled in the trench to a depth of about four meters or about twelve feet deep and about one meter or about three feet of soil 24 is piled over the waste to bury it. The waste is very heterogenous and may contain containers such as plastic bags, cardboard boxes, steel drums, glass containers, etc. which contain items of waste or waste fluids, along with loose items of waste. When radioactive waste was disposed of in this manner, it was believed that the waste would remain stable and not contaminate surrounding soil or ground water. However, it has now been found that contamination from such waste is continually percolating into soil and ground water. This flow of contamination can be expected to increase over time as the containers in the waste deteriorate and release whatever waste is contained in them, particularly if it is liquid waste. Because of the continuing flow of contamination from such waste sites, it is desirable in most cases to stabilize and/or immobilize the waste to prevent further flow of contamination therefrom such as may be caused by ground water flow or near surface storm water flow.

Figure 1:
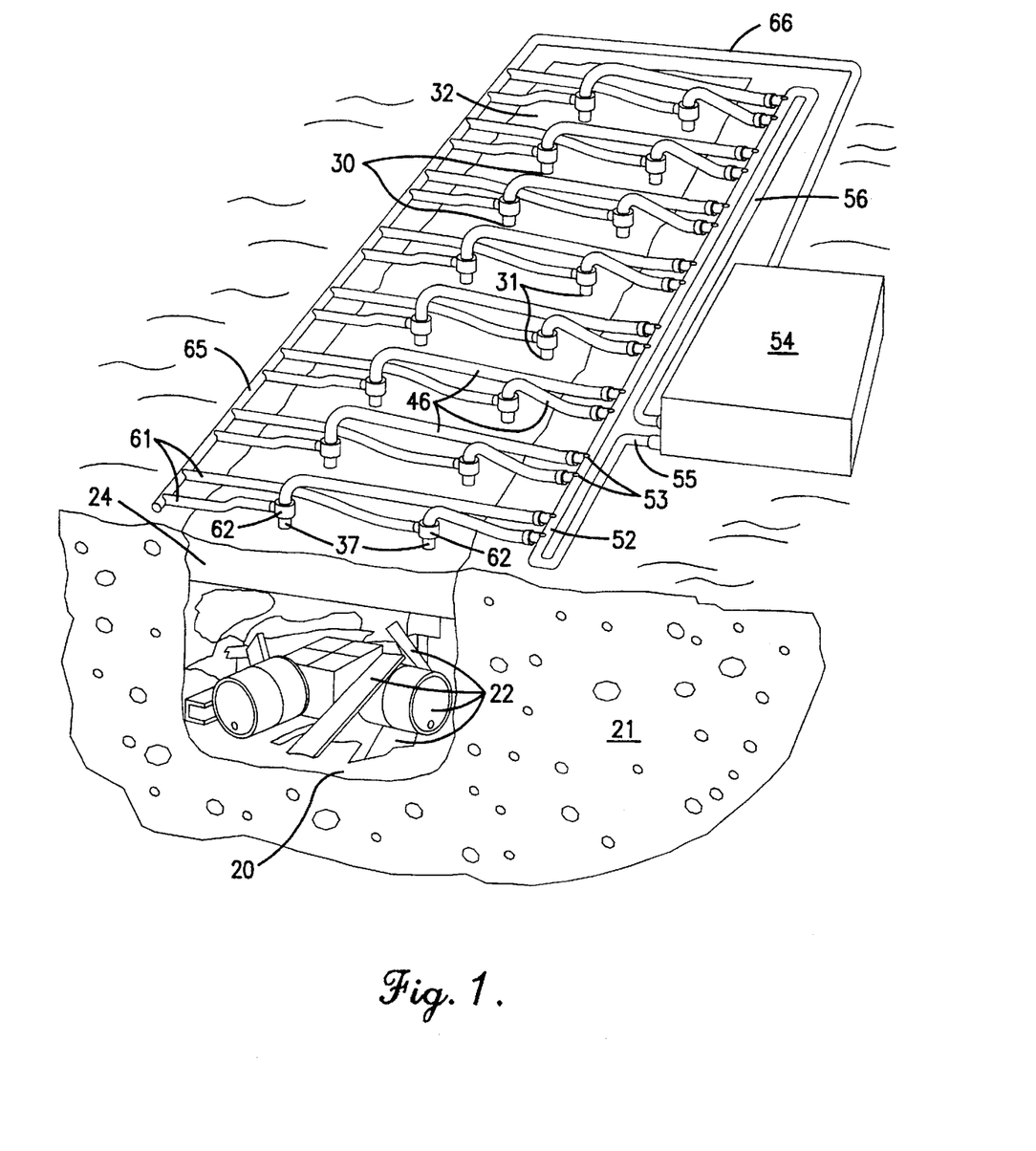
FIG. 1 is a vertical section pictorial view of a waste dump site showing some aspects of the remediation or stabilizing system of the invention installed therein.

The initial step in the method of the invention is to install a grid of injection holes in the waste deposit to be stabilized. When injecting stabilizing material into the waste deposit, the high velocity jets of stabilizing material used will be effective in cutting and breaking robust containers such as steel drums present in the waste material up to a distance of about 75 centimeters (the distance varies with different characteristics of the waste and the jets) and is effective in cutting less robust containers such as plastic bags and of mixing the waste and grout up to a distance of at least about 1.5 meters. Therefore, for the example being described, the injection holes should be no more than about 1.5 meters apart in any direction, and should not be farther than about 75 centimeters from the edge of the deposit. Thus, as shown in FIG. 1, for a deposit about ten feet wide, two rows of injection holes, shown as rows 30 and 31, respectively, are satisfactory with the rows about 1.5 meters apart and each row about 75 centimeters from the closest edge of the deposit. The holes in the rows will also be about 1.5 meters apart along the rows.

It should be understood that the row and hole spacing and number of rows needed will vary with the type of waste deposit being stabilized and the stabilizing material being used. Because the injection holes are preinstalled in the waste deposit, information about the waste deposit can be obtained through the installation of such holes. For example, penetration data can be gathered over the entire trench area during installation of the injection holes prior to injection, and waste specific properties, such as penetrability, are thus available and can be used to plan the injection in terms of jetting velocity. Chemical compatibility of the waste and stabilizing media can also be verified prior to injection based on the data gathered during installation of the drill holes 30 and 31.

It is also preferred that there be a slight depression 32 over the waste deposit. This may occur naturally as the waste compacts, or can be created over the waste deposit by mechanical compaction or excavation. The slight depression 32 serves as a sump for containing any grout or other stabilization material which may flow to the surface during treatment. Rather than a depression, a wall could be built around the area being treated as, for example, with sand bags. If the waste material may include shock sensitive items, detonation mats may be installed over the surface above the waste to contain any explosions which may occur during installation of the holes or later treatment of the waste.

Figure 2:
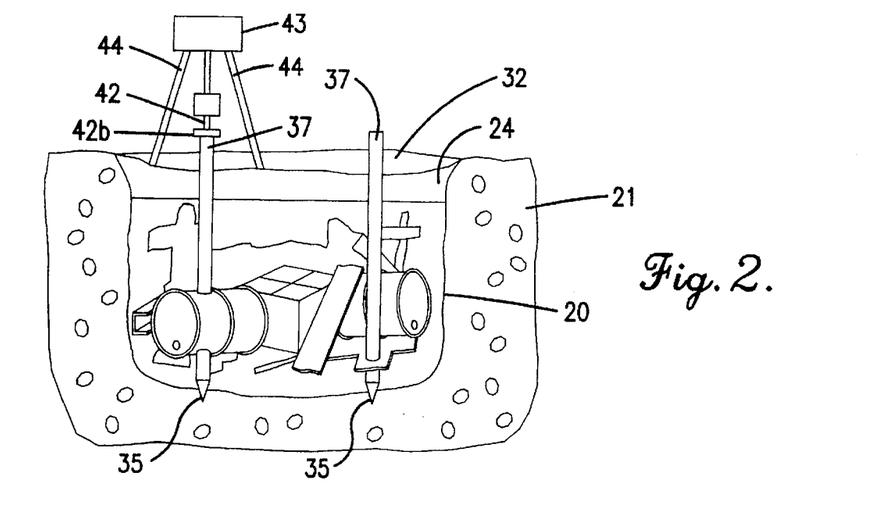
FIG. 2, a vertical section of a dump site similar to that shown in FIG. 1, but showing installation of the injection holes or wells.
Figure 3:
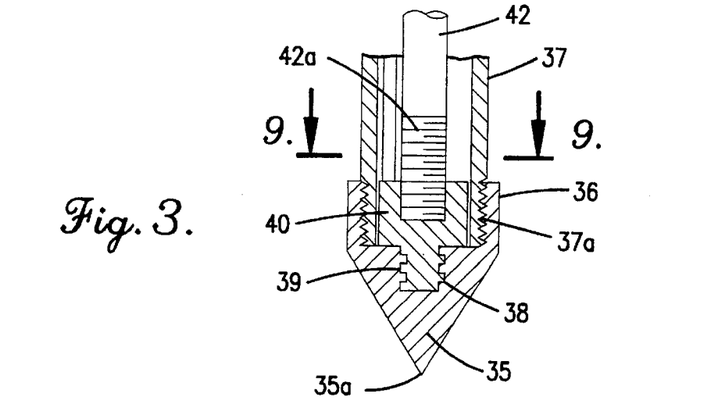
FIG. 3, an enlarged vertical section through a drill point of FIG. 2.
Figure 9:
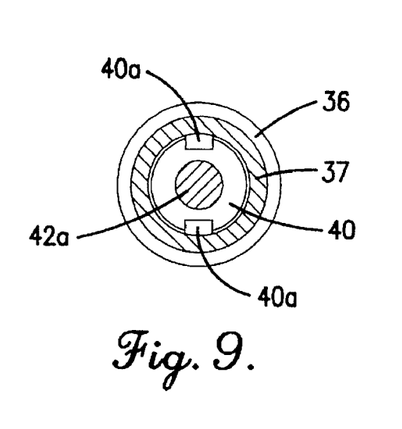
FIG. 9, an enlarged horizontal section taken on the line 9—9 and FIG. 3.

While the injection holes can be formed in a number of ways, including the drilling of such holes in normal manner, where it is desired to minimize contamination as it is with radioactive waste, it has been found advantageous to form the holes in a manner to avoid production of contaminated drill cuttings. For this purpose, a disposable drive point 35, FIGS. 2 and 3, tapering outwardly from a point 35a to a rear portion has an internally threaded circumferential flange 36 at the rear portion to receive and secure the forward, externally threaded end, 37a, of a length of disposable and cutable tubing 37. The cuttable tubing is such that the high velocity stream of fluid will quickly cut through the tubing, and may be made of various materials such as, for example, polyvinylchloride (PVC) or high density polyethelene (HDPE) pipe or tubing, or a loght gauge aluminum or steel tubing. The cuttable tubing forms tubular hole lining material. The drive point 35 has an internally threaded hole 38 to receive and secure a threaded end 39 of a bushing 40 therein. Bushing 40 is of a diameter to fit immediately adjacent or just barely against the inner wall of the tubular hole lining material 37 to hold it against distortion and thereby hold it more securely in threaded engagement with circumferential flange 36. Bushing 40 preferably includes two slots 40a, FIG. 9, extending longitudinally along the inner wall of the tube 37. These slots provide space for collection of any debris that may be present so it does not bind between the bushing 40 and inner wall of tubing 37, particularly if bushing 40 is rotated within the tubing such as to unscrew it from the drive point for removal from the tubing. Further, slots 40a allow air to pass by the bushing during removal thereof from tubing 37. While two slots 40a are shown and presently preferred, a single slot could be used, or more than two slots could be used. Drive point 35 and bushing 40 are preferably made of steel, but could be of other hard materials which allow the point to be driven through the waste. In talking about a drive point, the point 35a does not have to be sharp as shown in FIG. 3, but may be rounded instead. A sharp point will be used where it is desired to drive the hole through anything the point may encounter in the waste, while a rounded point will be used if it is desired to attempt to deflect items of waste in the path of the hole. The configuration of point used may also depend upon the type of waste involved.

Bushing 40 includes an internally threaded, centrally located hole 41 to receive and secure a threaded end 42a of a drive rod 42 therein. The drive rod is also preferably of steel or other similar material. The drive rod 42 provides a stem by which the point and secured tubing can be driven into the waste deposit, such as by a cat head and drop weight system 43, FIG. 2, supported by a portable frame 44. When the point has been driven through the waste deposit, the drive rod is unscrewed to release it from the point 35 and withdrawn and used for the next hole. The threads securing bushing 40 to drive point 35 are of opposite hand than the threads securing the end of the drive rod to the bushing. For example, the drive rod threads may be standard right hand threads while the bushing threads may be left hand threads. Thus, rotation of the drive rod 42 in one direction will unscrew drive rod 42 from bushing 40 so the drive rod can be removed, or rotation in the opposite direction will unscrew bushing 40 from drive point 35 so both the drive rod and bushing can be removed. This will generally be the preferred procedure.

Various other means of attachment of the tubing to the drill point for driving the tubing with the drill point through the waste to form a lined hole could be used.

The hole is lined or cased by the cuttable tubing 37, which isolates drive rod 42 from the waste material and prevents drive rod 42 from becoming contaminated. Point 35 and the installation system 41 is such that point 35 in most cases can be driven through the various containers such as boxes and steel drums included in the waste. If resistance is met, then the drive rod is removed from the casing and another hole is attempted. Since the cuttable tubing can be easily cut by the cutting jets, drill holes abandoned will not cause any problems with creating a homogeneous stabilized waste form. If desired, a flange 42b may be secured to drive rod 42 at the rearward end of cuttable tubing 37 so if cuttable tubing 37 becomes disengaged from the drill point 35, it will still be driven into the hole with the drill point by flange 42b. With the attachment embodiment shown, the rear portion of the drill point is larger than the cuttable tubing so provides a hole through which the tubing can be driven, if necessary. Flange 42b may include means such as an internal bushing to keep it centered in the end of tubing 37.

While a portable cat head and drop weight system 43 has been shown as an example of a means for driving the point and attached plastic pipe into the waste material, various other drive systems can be used. For example, an air operated percussion device suspended from a crane boom could be used, and in many instances, will be preferred. In such instances, the crane may be located in the safe area to the side of the waste deposit rather than over the waste deposit with only the boom of the crane extending over and suspending the percussion device over the waste deposit. Another example of a drive system is an in-hole hammer device. With any of the drive systems, such system can be set up and then operated remotely from a safe area away from the waste deposit to drive the hole. This can be important when working with a toxic or radioactive waste deposit or a waste deposit which may include shock sensitive materials which could explode if hit with a drive point. Expensive cutting equipment and workers are not required over the waste deposit during driving of the hole.

As indicated, the pre-installed holes 30 and 31 can be used for exploration of the site prior to injection. In addition to penetrability of the waste deposit, other properties and information, such as the chemical and radiologic character of the waste, can be obtained. If desired, various instrumentation packages can be inserted into the holes and will work through the casing to provide desired information about the waste deposit. The insertion holes lend themselves to use for real time sampling and analysis of the waste materials. Generally, since the holes will be used as the injection holes for the stabilizing material, many more of these holes will be installed than normal exploration holes. This will mean that better information regarding the deposit can be obtained on a real time basis when these holes are used for exploration purposes as well or for later injection of the stabilizing fluid. Decisions can then rapidly be made in the field with respect to the specific waste treatment required.

An important feature of the invention involves the closely sequenced injection of a stabilizing fluid over only a portion of the depth of the holes and adjacent portion of the waste deposit. It is presently contemplated that in most cases, at least for the example of radioactive waste, this stabilizing fluid will be a grout material, however, depending upon the type of waste to be treated, the stabilizing fluid may be a surfactant or other material to break down, neutralize, wash, or otherwise treat the waste or other material involved. In the case of surfactants, the multi-point injection procedure would be used to inject surfactants under high velocity to simultaneously cut and wash contaminates out of and away from their containers. Contaminated fluids, rather than remaining in the waste deposit, would be pumped from the washed area of waste by using well points installed in the waste deposit as at the lower points of the deposit which would collect such fluids, or by using various of the injection holes 30 and 31 as well points for removal of fluid. For this purpose, the casing in the holes to be used as well points will be perforated to allow fluid to flow through the casing into the holes. The closely sequenced injection of fluid as well as conducting the injection over only a portion of the depth of the holes at a time reduces the flow of fluid from the areas directly injected adjacent each hole to other parts of the waste deposit prior to the other parts of the deposit also being treated.

Figure 4:
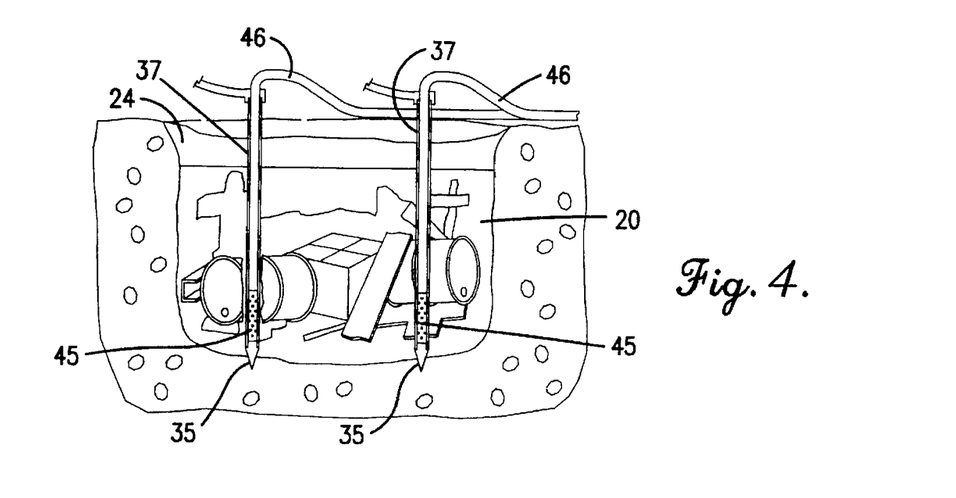
FIG. 4, a vertical section as in FIG. 2, but showing stabilization fluid monitors or injectors installed in the injection holes.
Figure 5:
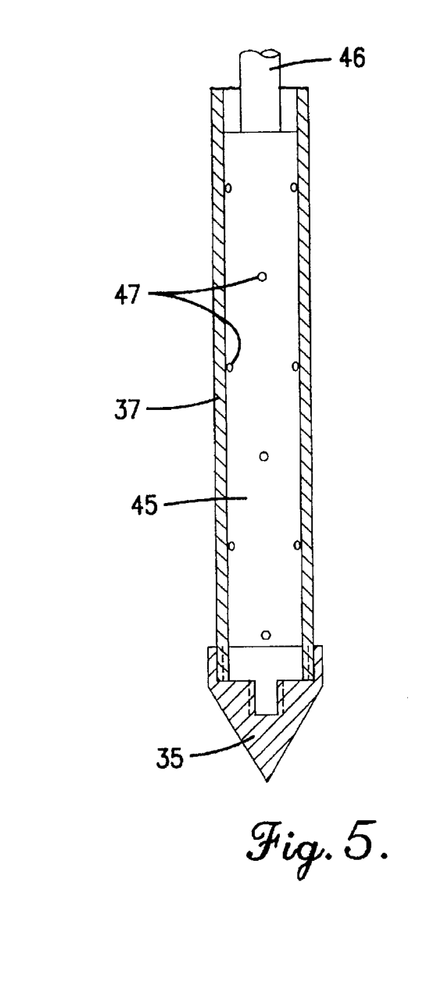
FIG. 5, an enlarged vertical section through the bottom of an injection hole showing an injection monitor of the invention in elevation.
Figure 6:
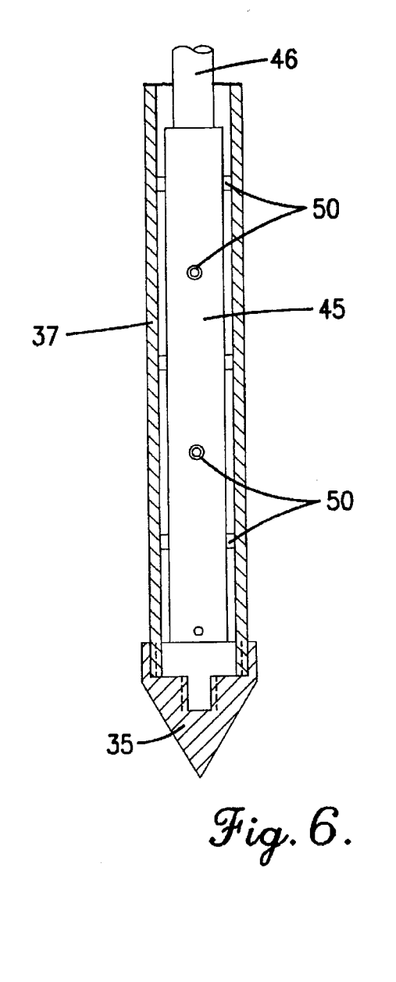
FIG. 6, an enlarged vertical section through the bottom of an injection hole similar to that of FIG. 5, but showing an alternate embodiment of an injection monitor of the invention.

To prepare for injection of the stabilizing fluid, injection monitors 45, FIGS. 4–6, secured to the end of pressure hoses 46, are positioned at the bottom of a plurality of adjacent injection holes 30 and 31, shown in FIG. 1 as being positioned in all sixteen holes provided for the particular waste trench deposit shown. The injection monitors are of a length less than the total depth of the holes, remain stationary in the holes during the injection, and have a pattern of nozzles 47 formed therein to imitate to an effective extent a rotating jet. The nozzles may be arranged in a spiral or similar pattern to direct jets 48 and 49, FIG. 7, of stabilizing material outwardly from the monitors. The monitors 45 may be about two feet in length and are made of steel tube to fit within the holes. Nozzles 47, FIG. 5, may be holes drilled through the steel tubing, or alternately, discrete nozzles 50, FIG. 6, may be welded into place along the outside of the steel tubing, screwed into threaded holes in the steel tubing, or otherwise attached to the steel tubing. Holes drilled through the steel tubing of the monitor are used where the monitor fits closely within an injection hole. Where the monitor is smaller than the injection hole, the separate nozzles are preferably used to place the jets closely adjacent the inner wall of the tubing 37 lining the injection hole. For example, if tubing 37 lining the injection hole has an inside diameter of four inches and the injection monitor 45 is made of steel tubing having about a two-and-one-half to three inch outside diameter, separate nozzles 50 are preferably used so that the ends of the nozzles are immediately adjacent the inner wall of tubing 37. This is preferred since the cutting ability of the jets emanating from the nozzles decreases as a function of distance from the nozzle outlet. Thus, it is desirable to have the jets originate as close to the injection hole inner walls as possible.

It is presently preferred to provide from 4 to 20 nozzles arranged around the steel monitor tube, such as in a spiral arrangement. The number of nozzles used will depend upon the total depth of injection required, types of containers to be cut, and required effective cutting distance. In addition, a limiting consideration in the number of nozzles used will be the capacity of the high pressure pumping equipment available to supply the high pressure fluid to the monitors and the size of the nozzles used. The number of nozzles and spiral or similar arrangement is used to mimic rod rotation and lift over a discrete interval. The nozzles are arranged to direct stabilizing fluid radially outwardly from the monitor, preferably in about eight directions as shown by arrows 48 and 49 representing high velocity jet streams in FIG. 7. Since the nozzles are arranged around the monitor 45 in a spiral or similar manner, various of the arrows in FIG. 7 will be located at different vertical depths.

Figure 7:
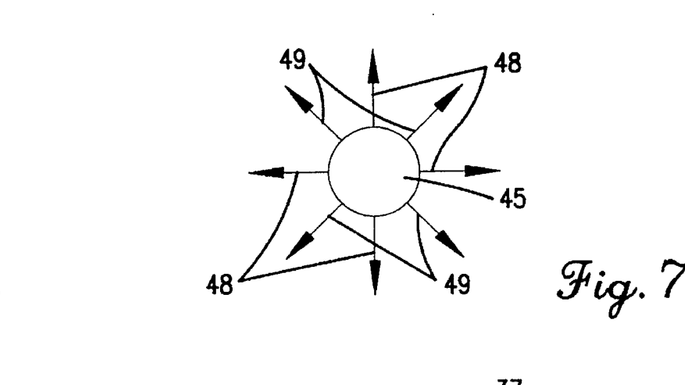
FIG. 7, a schematic top view showing of an injection monitor as shown in FIG. 5, indicating the directions of fluid flow radially from the injection monitor.
Figure 10:
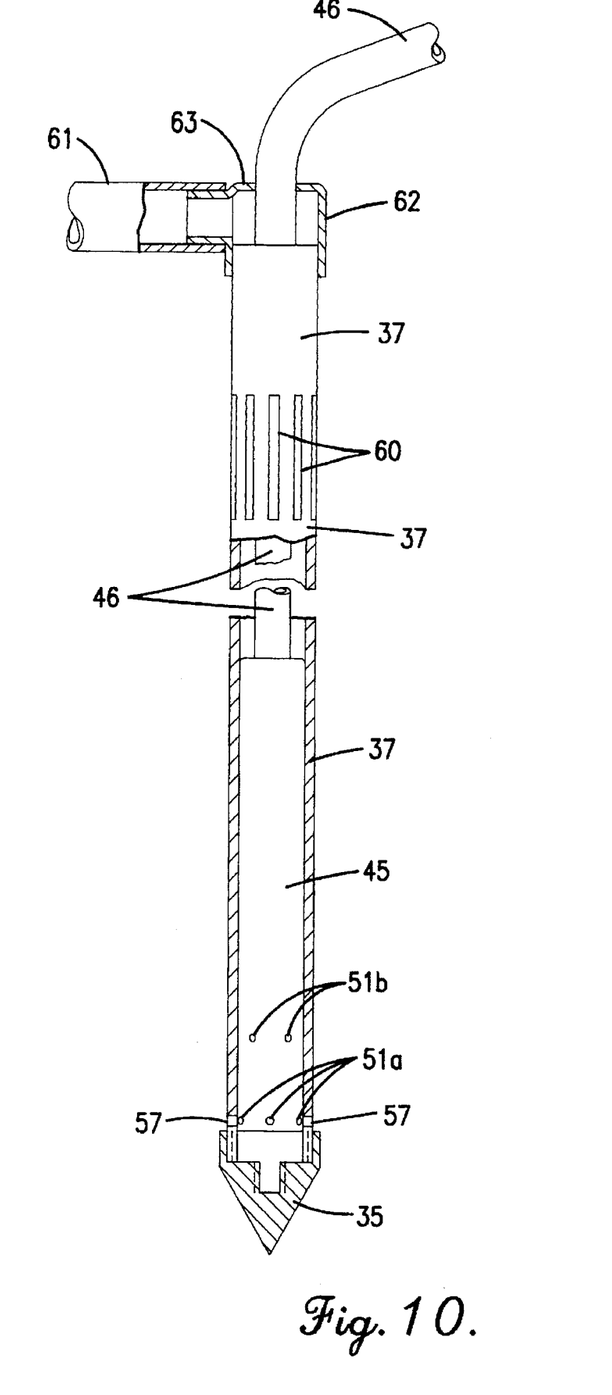
FIG. 10, a fragmentary enlarged view of one of the injection holes with monitor therein showing a different nozzle arrangement.

One arrangement for the monitor that has been found satisfactory is shown in FIG. 10 and has eight nozzles arranged at two locations along the length of the monitor. At each location, four nozzles are spaced around the monitor at about ninety degree intervals, with the nozzles at one location rotated about forty-five degrees from the orientation at the other location. The two locations are about six inches apart along the length of the monitor with the first location adjacent the bottom of the monitor. Thus, four nozzles 51a are spaced ninety degrees apart around monitor 45 and located adjacent to the bottom of monitor 45, with nozzles 51b spaced ninety degrees apart around monitor 45 at a location spaced about six inches along the length of monitor 45 above nozzles 51a. As shown in FIG. 7, nozzles 51a will produce high velocity streams represented by arrows 48 and nozzles 51b will produce high velocity streams represented by arrows 49. Increased lengths of treatment can be obtained if a sufficient supply of fluid is available to supply the additional nozzles by adding additional sets of four nozzles in the configuration shown at six inch intervals above one another along the length of the monitor. A two foot treatment length can be obtained by use of five sets of four nozzles each spaced six inches from the other.

The nozzles used may be of various types and will generally be either pin type nozzles which produce a narrow, high velocity directed stream of stabilizing fluid which cuts through the waste material adjacent the hole and through various containers in the waste material or fan type nozzles which produce a flat spray over an arc of up to about ninety degrees which mixes the waste and stabilizing fluid over a larger area than the pin jet stream. The effective distance for penetration of these jets and the types of containers which can be cut by the jets depends upon the pressure of the fluid creating the jets and the properties of the waste and containers in the waste to be treated. The pressure can be adjusted based upon the desired treatment. For example, the waste material may include drums of waste. In some cases, it will be desirable to cut into the drums to release the waste therein to mix with the stabilizing fluid and so that the stabilizing fluid can flow into the drum as part of the stabilizing process, where in other instances, it may be desirable to not breach the integrity of such drums and to merely encapsulate them. The stabilizing fluid used and the pressure used to create the high velocity jets will be adjusted and chosen for the desired result.

The pin jets are most effective for cutting through various containers and loosening the waste material for an effective distance from the injection hole. Fan jets provide a wider spray of stabilizing fluid which for some types of waste, such as loose waste and plastic bags, is more effective in mixing the waste with the stabilizing fluid. Thus, in many instances, it will be desirable to provide a combination of pin jets and fan jets of stabilizing fluid to thoroughly mix and stabilize the waste. The number and arrangement of jet nozzles and fan nozzles on a particular monitor will be chosen to produce the desired results in the particular waste deposit to be treated.

With an injection hole arrangement as shown in FIG. 1, pin jets will spread out as they extend further from the injection holes. Thus, effective treatment can be achieved using just pin jets as the pin jets will cut containers surrounding the holes for an effective cutting distance and beyond the effective cutting distance, as such jets approach an adjacent hole, the jets will spread and effectively mix the waste. Thus, as adjacent holes are injected, effective cutting and mixing of the waste material between holes is achieved. By the time a jet reaches an adjacent hole, it will have spread out and lost energy to the extent that it will not cut the casing of the adjacent hole. It can generally, however, still mix material next to the adjacent hole.

Hoses 46 extend out through the top of the holes and extend to a manifold 52, FIG. 1. Each hose 46 is connected to the manifold 52 through a valve 53. Block 54 represents an uncontaminated area away from the waste site where workers and capital equipment can be located. Such area will be the location of the source of pressurized stabilizing fluid such as grout and includes standard grout mixing equipment and high pressure pumps (not shown) to supply grout under high pressure, usually between about 6,000 and 20,000 PSI, through pressure line 55 to manifold 52. Valves 53 control the flow of the high pressure grout or other stabilizing fluid to particular monitors. The high pressure grout in manifold 52 is preferably also connected to return line 56 to form a closed pressure loop back to the grout mixing equipment to reduce pressure shock on the system as valves 53 close. Various other desired equipment, controls for the equipment, and personnel involved in the remediation process will be in area 54 during the injection operation away from any possible contamination or other danger. While area 54 is represented schematically as a box, this area is not necessarily enclosed and will generally just be a designated open area of ground adjacent to the waste deposits being treated.

The nozzles used with the monitor to create the high velocity stabilizing fluid jets will preferably be between about 1.8 and 2.4 millimeters in diameter. The important parameter for effectiveness of cutting and mixing by the high velocity streams is the velocity of the streams. For good cutting of most materials, the streams should have a velocity of at least about 750 ft./sec. A velocity of 1400 ft./sec. has been found effective for cutting of steel drums. Thus, the pressure, size of the nozzles, number of nozzles, and the supply capacity of the high pressure pumps all have to be coordinated to provide the desired high velocity streams. In addition, the nature of the stabilization fluid used must be considered as some grout materials, if not properly filtered, may clog smaller nozzles.

During the injection of the stabilizing fluid, valves 53 are operated (these can be operated remotely from area 54) to connect one monitor at a time to the high pressure source of stabilizing fluid. When a monitor is connected to the high pressure source of stabilizing fluid, high velocity streams of fluid are sprayed from the nozzles in the direction of arrows 48 and 49, FIG. 7. These high velocity streams easily cut through the cuttable casing 37 and into the surrounding waste, cutting containers and mixing the waste and stabilizing material to form a monolith of stabilized waste. The high velocity streams are maintained for between about forty-five and one hundred and twenty seconds, during which time the streams cut through containers in the surrounding waste and saturate the area around the hole with stabilizing fluid. It has been found that the fluid streams from the monitors will cut small holes 57, FIG. 10, in the cuttable casing 37 big enough for the streams to pass through, but will otherwise leave the casing intact. This means that the injection holes can be used for pretreatment or initial treatment, if desired in treating certain types of materials, and then reused for additional treatment, such as later grouting.

In some instances during the injection of the stabilizing fluid into the material being treated, fluid, gases, or vapors may be released from the material and travel up the hole and be released at the top of the hole, around the hose, to the atmosphere. In other cases, material may be released around the hole if the hole casing is sealed. It is therefore preferred to provide some perforations, such as vertical cuts 60, FIG. 10, (such cuts could also be horizontal) in the portion of casing 37 in the upper part of the deposit so that any material flowing upwardly around the outside of the casing can enter the casing and be released through the top of the hole. In situations where the material released may be contaminated or toxic, it will be desirable to collect such material. For such purpose, vacuum or suction hoses 61, FIGS. 1 and 10, are connected to tees 62 mounted on the tops of the cuttable tubes 37 which line the holes 30 and 31 and may include top collars 63 which closely, but losely, surround the pressure hoses 46. The pressure hoses 46 can still easily be moved up and down through sleeve 63 to change the positions of the monitors in the holes. Suction hoses 61 are connected to a vacuum manifold 65 which extends around the waste deposit and is attached through piping 66 to a standard filter or collection system and vacuum source (not shown) in area 54. The vacuum source will generally provide enough flow from each tee so that sealing around the pressure hose as it extends outwardly from the tee is not necessary. However, if sealing is found to be necessary in some instances, various types of seals can be provided.

Figure 8:
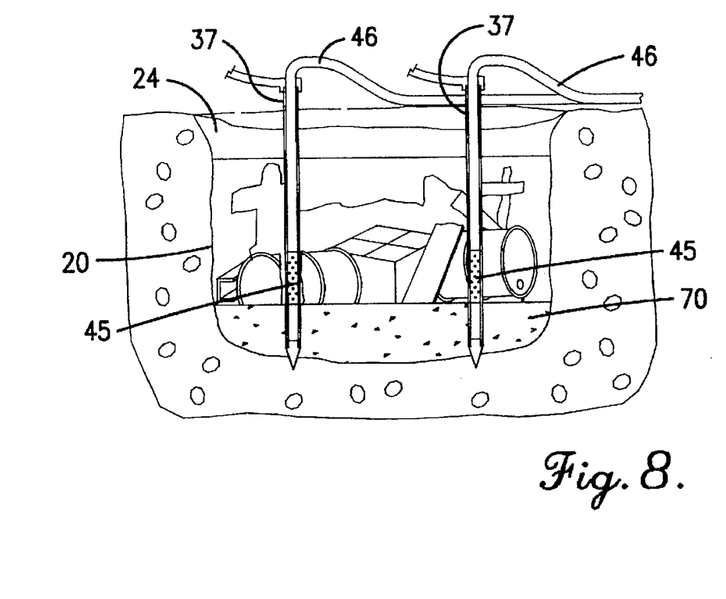
FIG. 8, a vertical section as in FIG. 4, showing the injection monitors moved within the injection holes in accordance with the system of the invention.

An important aspect of the invention is that only a portion of the depth of an injection hole is treated at any particular time. Thus, rather than rotating and lifting a jet of stabilizing fluid through the entire depth of an injection hole as done in prior art jet grouting procedures to thereby treat the entire injection hole before moving to another injection hole, with the present invention, only a portion of the injection hole is treated with similar portions of adjacent injection holes treated before additional portions of the injection holes are treated. As illustrated in FIGS. 4 and 10, with monitors 45 at the bottom of each hole, stabilizing fluid is injected into the holes over the length of nozzles along the monitor. The jets easily cut through the cuttable casing 37 as indicated and spread into the surrounding waste material. Immediately after the period of injection, which is determined to be the time necessary to cut through waste containers adjacent the injection hole and to thoroughly mix the waste material surrounding the hole with the stabilizing fluid to a desired distance around the hole, an adjacent hole is similarly treated. After treating a plurality of injection holes in this manner, injection is stopped and the hoses and monitors are raised to a new level. This can be done either manually by workers at the injection hole or automatically from the sides of the waste deposit so workers need not walk over the waste site. The new level may be just above the level that was previously treated or, with the monitor arrangement of FIG. 10, an overlapping level where the lower nozzles 51*a* will be at about the level of upper nozzles 51*b* during the previous injection cycle. Thus, as shown in FIG. 8, the monitors are raised to the next level for treatment. Again, a plurality of holes are then treated in rapid succession at this next level, each for the predetermined time period and again the monitors are raised to the next level. The rapid sequential treatment is easily accomplished by operation of the valves 53. While the ideal situation would be to operate the monitors in all holes of a waste deposit simultaneously, this would require an inordinate number of pumps to supply sufficient stabilizing fluid under sufficient pressure to all monitors. The sequential operation of adjacent monitors appears to work as well as simultaneous injection.

The object of the invention and of the sequential operation of the monitors over only a partial depth of the injection holes at any time is to adequately treat the waste material adjacent each hole within the effective range of the jets and to treat adjacent holes before stabilizing material used to treat one hole can flow substantially out of the range of effective treatment toward other holes to interfere with effective treatment of waste surrounding such other holes. With the treatment of only a portion of a hole at a time, the treatment of the waste deposit is done in layers. Thus, after treatment, for example grouting, of the waste deposit with the monitors at the bottom of the injection holes as shown in FIGS. 4–6, a layer of grout 70, FIG. 8, is built up in the waste deposit to the depth of the holes treated. The monitors are raised in the holes to a position shown in FIG. 8 so the bottom of the monitors are at or near the top of the grout layer 70. The monitors are then again operated sequentially to create a second layer or level of grout. This procedure will generally be repeated with additional layers formed until the entire waste deposit is stabilized. It is preferred that the grout remain uncured while other grout layers are added so that the grout through all layers form a honogeneous grout monolith. In some cases, however, it may be desirable to only provide, for example, the bottom layer 70 to seal the bottom of a waste deposit. In other cases, it may be desirable to only operate monitors along an edge of a waste deposit or in other patterns to create walls or cells in the waste deposit.

Figure 11:
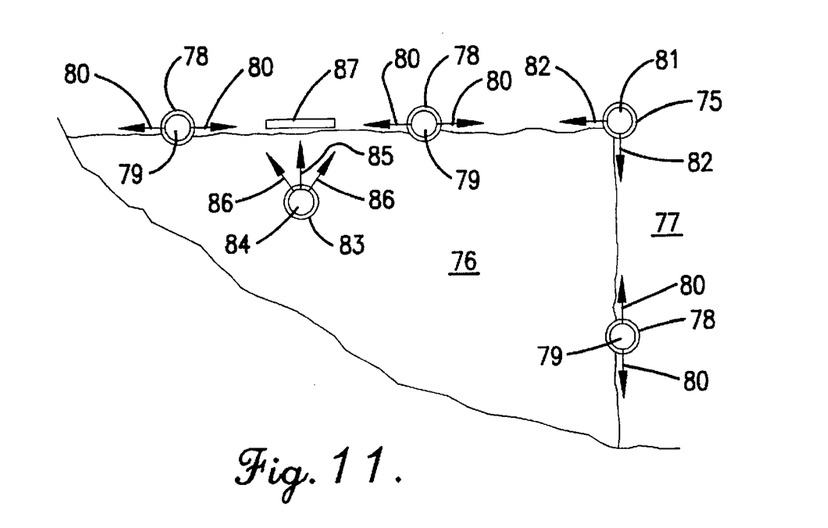
FIG. 11, a top plan schematic view of a waste deposit showing the location of injection holes, monitors therein, and directions of grout streams for producing walls.

For example, if a wall is desired, a plurality of holes may be installed along the edges of a waste deposit. Thus, as shown in FIG. 11, a hole 75 is installed at the corner of a waste deposit 76 at the interface between the waste deposit 76 and the confining ground 77. Holes 78 are installed at the interface of the waste deposit 79 and the confining ground 77 along the edges of the waste deposit. The monitors 79 used for creating the high pressure streams in the holes 78 along the edges of the waste deposit have nozzles spaced 180 degrees apart around the monitor to produce high pressure streams indicated by arrows 80. The streams cut through earth and waste material close to the holes and mix into a homogenious grout and earth-waste mixture farther from the holes and up to adjacent holes. When forming walls, relatively fast setting grout is used so that it remains unset while adjacent holes at particular depths are sequentially treated, but sets before it can flow substantially beyond the injected areas. The monitor 81 in the corner hole 75 has nozzles spaced ninety degrees in one direction and 270 degrees in the other direction to direct streams of grout indicated by arrows 82 from the corner along the side edges of the waste deposit. These, in combination with the adjacent holes 78 and streams 80, form walls and corners to enclose the waste deposit.

Alternatively, or in addition to the holes 75 and 78, walls can be created by a series of holes 83 (only one such hole being shown in FIG. 11) installed in the waste deposit near the edges thereof, and having a monitor 84 therein with nozzles arranged to direct streams of grout directly toward the edge of the deposit as indicated by arrow 85, and at angles such as forty-five degrees to the edge of the deposit as indicated by arrows 86. For the stream of grout 85 directed directly toward the edge of the deposit, a deflection plate 87, such as one inch thick steel plate, is installed upon which the jet impinges and which creates the turbulence and mixing of the grout and earth-waste mixture to form the homogeneous mix to form that section of the wall. The jets at an angle to the edge of the waste deposit will generally cause mixing along the edge without the deflection plate.

While personnel may be required on the waste deposit between the actual injection of stabilizing material into the waste deposit to lift the monitors within the holes and reposition them for the next round of injections (although this could be done by a crane or backhoe from the side of the deposit so workers are not exposed to any grout or other stabilizing material which may flow out of the waste or injection holes during the treatment), it should be noted that the personnel are not on the waste deposit during the actual injection of stabilizing material, which is the dangerous time. All personnel and expensive equipment are in area 54 during injection. Further, in some cases, it may be desirable to lift a monitor a short distance during actual injection. This may be true where sufficient pumping capacity cannot be provided at a site to adequately supply the number of nozzles required to cover a desired height of the injection holes. Thus, where a two foot depth of a hole is to be covered during a single injection time, but pump capacity is adequate for the number of nozzles to only cover a one-half foot section, a monitor may be lifted slowly over the two foot section of the hole during injection to give the desired injection height. For this lifting, the monitor will be arranged to be lifted remotely from the edge of the waste site. In such instance, however, it should be noted that a plurality of nozzles are still provided on the monitor to simulate a rotating jet, the monitor is lifted straight up with no requirement that it be rotated, and the lift provided still only occurs over a portion of the hole, not the entire height of the hole. In such instance, since the monitor is lifted without rotation, only simple equipment for lifting is necessary.

Figure 12:
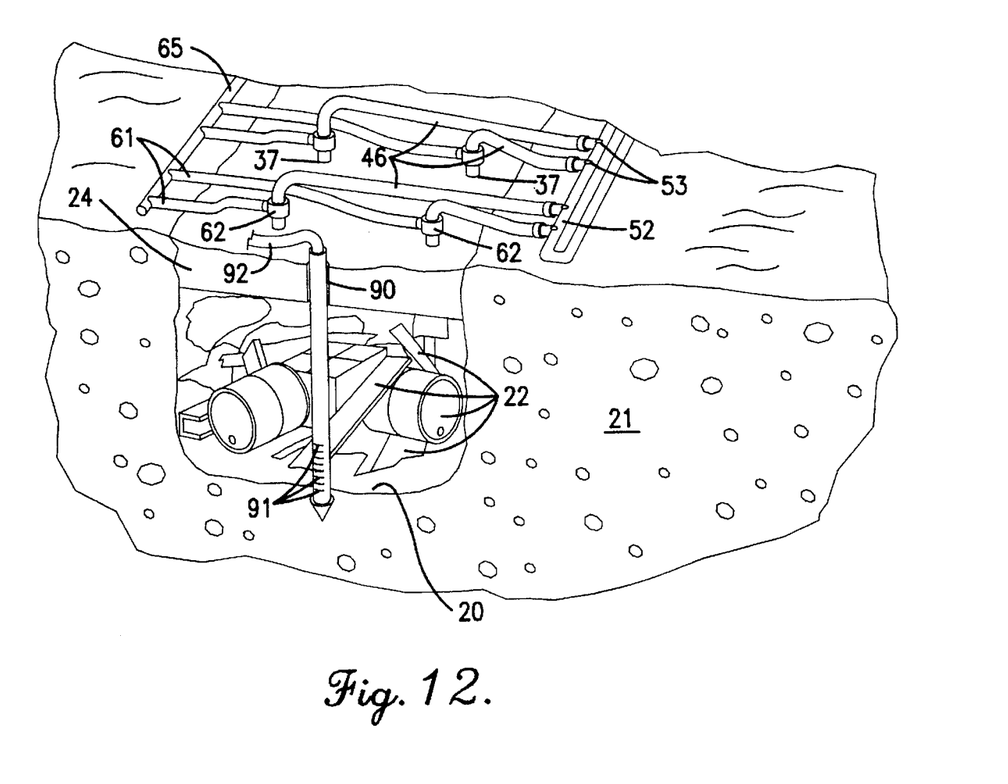
FIG. 12. A fragmentary vertical section pictorial view of the waste dump site of FIG. 1, showing an additional hole used as a well point.

FIG. 12 shows a waste site similar to that of FIG. 1, but with only a portion of the waste site shown and with parts carried over from FIG. 1 carrying the same reference numbers. In addition to the injection holes 30 and 31, a similar hole 90 is provided as a well point for drawing out fluid which collects in the bottom of the waste deposit during fluid injection other than grouting, such as in a washing operation. The plastic tube which forms and lines hole 90 has a series of horizontal cuts or openings 91 therein (these could be vertical cuts similar to cuts 60 of FIG. 10) to allow fluid to flow into the tube. A hose 92 extends from hole 90 to a pump (not shown) which pumps fluid from the hole in normal manner. The fluid, if contaminated, is treated when it reaches the surface. If not contaminated, or after treatment if contaminated, the fluid removed can be recirculated or disposed of. Any of the injection holes installed for practice of the method of the invention could be perforated and used at times as well points.

Many waste deposits contain substantial void spaces. These void spaces may be within containers included as part of the waste, such as drums, jars, and boxes, or between costituient parts of the waste. With the treatment of the invention which cuts into and breaks up various containers and mixes the waste constituients, the volume of the waste can be reduced. While the grout added to the waste during treatment will take up at least some of the reduced volume of the waste, in many cases, the total volume of the mixed grout and waste will be less than the volume of waste prior to treatment.

In testing the method and apparatus of the invention, it was found that the high velocity jets from the monitors, with jet speed of about 1400 ft/sec. would cut through a steel drum at a distance of two feet in about fifty seconds. A rotating jet of the prior art would not cut through the steel drum because of the movement of the jet.

In further testing, several steel containers (10'×5'×3') of waste similar to waste expected to be found in a deposit of radioactive waste similar to that shown in FIG. 1, were treated with two injection holes and the monitor of FIG. 10. The monitor used to treat two of the containers used 1.8 mm nozzles. Grout pressure of 7000 psi was used. However, the grout mix was not properly handled and several of the nozzles clogged during testing. With clogged nozzles, areas of unsatisfactory grouting of the waste material in the areas where the grout streams were blocked was observed. A third container was tested with the same grout supplied at 11,000 psi and with 2.4 mm nozzles. These larger nozzles were used to prevent the nozzle plugging that occured with the smaller nozzles. Jet velocity leaving the nozzles was about 1400 ft/sec. Core samples of the hardened grout showed good penetration of grout into all waste materials and the absence of large voids.

Since an important aspect of waste grouting is to form a monolith of grout and waste wherein the monolith has very little conductivity of water, a water conductivity test was performed. Guelph Permeameter testing equipment supplied by Soil Moisture Equipment Corporation of Santa Barbara, Calif. was used and the equations used for data reduction and evaluation were those shown in the manual for the equipment. The tests were performed on three bore holes that were drilled into the hardened grout material monolith. The results of the testing is shown in Table 1.

TABLE 1

| Borehole ID | Test Level in Waste | Depth From Top of Tank (in.) | Permeability Head $H_1$ (cm) | Test Data Flow $Q_1$ (cc/sec) | Test 1 Duration $T_1$ (min) | Permeability Head $H_2$ (cm) | Test Data Flow $Q_2$ (cc/sec) | Test 2 Duration $T_2$ (min) | Average Hydraulic Conductivity (cm/sec) |
|---|---|---|---|---|---|---|---|---|---|
| 1 | a | 19 | 10 | 0.0098 | 209 | 16 | 0.1028 | 441 | 1.90E-04 |
|   | b | 26 | 10 | 0.0048 | 1275 | 15 | 0.0028 | 1204 | -7.7E-06 |
| 2 | a | 19 | 10 | 0.0013 | 1358 | 16 | 0.0025 | 1095 | 1.70E-06 |
|   | b | 27 | 10 | 0.002 | 1265 | 15 | 0.003 | 1358 | 1.60E-06 |
| 3 | a | 16 | 10 | 0.0013 | 1148 | 16 | 0.0025 | 1164 | 1.90E-06 |
|   | b | 23 | 10 | 0.0017 | 1220 | 15 | 0.0022 | 1358 | 1.2E-07 |

The first series of tests, designated "a" level, were performed within each borehole at about nineteen inches below the top of the steel container. This depth corresponds to a conductivity test which is about six inches (15 cm) into the uppermost portion of the waste (portion nearest the surface). The second level of of tests, designated as "b" level, were conducted at about six inches below level "a." The heads of water injected into each bore hole were ten cm. and 15 (or 16 cm.) for each test listed. The data analysis required two water levels for calculating the hydraulic conductivity. The upper level of fifteen cm. was selected since it corresponds to the maximum incremental thickness of solidified waste drilled, i.e., about six inches (15 cm.) Therefore, for each two conductivity tests performed in each borehole every portion of the borehole surface area was exposed to permeating water. This methodology allows evaluation of the incremental homogeneity of grout treatment which the waste has undergone.

The conductivity testing performed in borehole No. 1 indicates that the waste has a conductivity of about 1.9E-04 cm/sec within level "a". This is the highest permeability measured for any portion of the tank tested. All other values of conductivity listed in Table 1 are at least 100 times lower than the 1.9E-04 cm/sec value measured for No. 1 level "a". It is believed that this occurred because grouting was not performed within this level of the waste. Grout injection ceased about 6 inches below the top of the waste in the third container.

The second conductivity measurement conducted in borehole 1 level "b" produced a negative value for conductivity. This was caused by measuring a higher flow rate (0.0048 cm/sec) under a lower head (10 cm) versus the lower flow rate (0.0028 cm/sec) measured when 15 cm was imposed. It appears that the 0.0028 cm/sec flow rate is comparable to the other values measured for borehole Nos. 2 and 3, in which conductivities between 1.9E-06 to 1.2E-07 cm/sec were measured.

The data on Table 1 for the two sets of permeability tests conducted in Borehole Nos. 2 and 3 indicate that the values are all about the same (nearly 1.0E-06 cm/sec). This would indicate that the cemented structure of the waste was comparable for the regions encapsulated by Borehole Nos. 2 and 3. The values of 1.0E-06 cm/sec is considered very low when compared to the original conductivity of the waste which was estimated to be 10 cm/sec, as indicated by the flow of grout within the waste in the container during the injection of liquid cement grout slurry.

Prior art low pressure (50 psi) cement injection has been performed in a waste trench with waste comparable to the waste deposited in the test containers. The low pressure grouting of the trench waste did not have much beneficial affect on lowering the hydraulic conductivity of the waste. The conductivity within the waste after low pressure cement injection was measured at about 1.0E-01 cm/sec. The conclusion reported by the researchers conducting the test was that "Portland cement, fly ash and bentonite will NOT likely reduce contaminate leaching if breached by groundwater." However, the above reported tests show that using ordinary Portland Cement Type 1 grout in the process of the invention can effectively lower waste conductivities significantly (1.0E-06 cm/sec). The conductivities of natural ground surrounding a waste trench had a measured conductivity of about 1E-05 cm/sec. Therefore, for the tests conducted in the third container, the majority of the waste has been grouted to a conductivity lower than that measured on the natural ground around waste sites to be treated. The higher conductivity (1.9E-04 cm/sec) value reported for borehole No. 1 level "a" was due to not grouting the upper 6 inches of the waste in the vicinity of borehole No. 1. It should be further noted that even the value of 1.9E-04 cm/sec is about 500 times lower than the conductivity obtained using the reported prior art waste grouting procedures for shallow buried waste.

While the invention has been illustrated and described in detail in connection with an underground waste deposit, the invention can be used to treat various types of material, particularly confined material such as areas of ground contamination, sludge lagoons, and tailing ponds (confined by surrounding earth) or materials artificially confined such as materials settled in tanks or materials placed in a container for treatment.

If it is difficult to drive the drill point with attached cuttable tubing through the material to be treated, such as if the material has large metal objects buried therein or is rocky, the holes can be formed by driving a drill point and steel casing through the material to be treated. Cuttable tubing can then be inserted into the steel casing and the steel casing removed from the hole to leave a hole with cuttable casing.

In some instance, a waste deposit with flammable or shock sensitive items therein may catch fire. If the fire starts during preparation for or during treatment, fire retardent foam or other fire fighting fluids may be injected as the treating fluid using the method and equipment described. Further, the method of the invention may be used to install holes in a burning area for injection of fire fighting fluids. Fire fighting is considered a treatment for the burning material and the fire fighting fluids are the treating fluids for purposes of the invention.

The invention can also be used to treat material in submerged areas. In such instances, the casing of the injection holes will be perforated, such as shown for well point 90 in FIG. 12, and the water will be pumped from the material to be treated as a pretreatment step. The water may be stored and mixed with concrete to form the grout for the later grouting step, wherein the grout is used to grout the material. In this way, the water is recycled. Alternatively, the water removed from the material can be disposed of or treated and disposed of.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

We claim:

1. Apparatus for use in creating a lined injection hole through material to be treated by injection of a fluid into the material through which pressurized treating fluid may be injected into the material, comprising:

a hardened drive point having a pointed forward end and tapering outwardly therefrom to a rear portion;

a length of tubular hole lining material having a forward end and rearward end, said tubular hole lining material being cutable by a high pressure stream of fluid directed outwardly from inside the tubular material;

means on the rear portion of the drive point for attaching the forward end of the tubular hole lining material to the rear portion of the drive point;

a drive rod having a forward and rearward end;

means centered in the rear portion of the drive point for removably attaching the forward end of the drive rod to the drive point, whereby the drive point can be driven into and through the material to be treated by forwardly directed pressure transmitted to the drive rod.

2. Apparatus for use in creating a lined injection hole through material to be treated, according to claim 1, wherein the rear portion of the drive point includes a circumferential flange, the forward end of the tubular hole lining material fits within the circumferential flange, and wherein the circumferential flange is internally threaded, and the forward end of the tubular hole lining material is externally matingly threaded, whereby the forward end of the tubular hole lining material is attached to the rear portion of the drive point by being screwed thereinto.

3. Apparatus for use in creating a lined injection hole through material to be treated, according to claim 2, wherein the tubular hole lining material is cylindrical and has an internal wall, and wherein the rear portion of the drive point includes bushing means extending into the forward end of the tubular hole lining material immediately adjacent the internal wall to maintain the tubular hole lining material is threaded engagement with the circumferential flange.

4. Apparatus for use in creating a lined injection hole through material to be treated, according to claim 3, wherein the bushing incudes at least one slot extending longitudinally along the internal wall of the tubular hole lining material.

5. Apparatus for use in creating a lined injection hole through material to be treated, according to claim 4, wherein the bushing is threadedly and removably screwed to the rear portion of the drive point.

6. Apparatus for use in creating a lined injection hole through material to be treated, according to claim 5, wherein the forward end of the drive rod is threaded and is threadedly and removeably secured to the bushing.

7. Apparatus for use in creating a lined injection hole through material to be treated, according to claim 6, wherein the threaded securement of the drive rod to the bushing is of opposite hand to the securement of the bushing to the drive point.

8. Apparatus for use in creating a lined injection hole through material to be treated, according to claim 1, wherein the drive point is steel.

* * * * *